United States Patent
Pena et al.

(10) Patent No.: US 10,308,178 B2
(45) Date of Patent: Jun. 4, 2019

(54) DETECTION OF THE PARTIAL AND/OR TOTAL FAILURE OF A GROUP OF LIGHT SOURCES ON A VEHICLE

(71) Applicant: VALEO ILUMINACION, Martos (ES)

(72) Inventors: Miguel-Angel Pena, Martos (ES); Antonio Domingo Illan, Martos (ES); Jose-Ramon Martinez-Perez, Martos (ES); Juan Lara Cabeza, Martos (ES); Juan-Jose Santaella, Martos (ES); Tomas Martinez-Zaldivar, Martos (ES)

(73) Assignee: VALEO ILUMINACION, Martos (ES)

( * ) Notice: Subject to any disclaimer, the term of this patent is extended or adjusted under 35 U.S.C. 154(b) by 0 days.

(21) Appl. No.: 15/586,668

(22) Filed: May 4, 2017

(65) Prior Publication Data
US 2017/0320432 A1    Nov. 9, 2017

(30) Foreign Application Priority Data

May 4, 2016   (FR) ..................................... 16 54072

(51) Int. Cl.
*B60Q 11/00*    (2006.01)
*H05B 33/08*    (2006.01)

(52) U.S. Cl.
CPC ......... *B60Q 11/005* (2013.01); *H05B 33/089* (2013.01); *H05B 33/0893* (2013.01)

(58) Field of Classification Search
CPC .............. B60Q 11/005; H05B 33/0893; H05B 33/0875; H05B 33/089; H05B 37/03; H05B 37/032; H05B 37/034; H05B 37/036; H05B 37/038; G01R 31/44
See application file for complete search history.

(56) References Cited

U.S. PATENT DOCUMENTS

| | | | |
|---|---|---|---|
| 4,674,090 A * | 6/1987 | Chen ..................... | G11C 29/38 714/736 |
| 2003/0137427 A1 | 7/2003 | Tichborne et al. | |
| 2004/0155844 A1* | 8/2004 | Stopa ................. | H05B 33/0815 345/82 |

(Continued)

FOREIGN PATENT DOCUMENTS

| | | | |
|---|---|---|---|
| DE | 10 2009 019 752 A1 | 12/2009 | |
| DE | 102012218772 B3 * | 10/2014 | ......... H05B 33/0893 |
| JP | 07334772 * | 12/1995 | ............. G08B 25/00 |

OTHER PUBLICATIONS

Translation of JP07334772 Otsuki Akira; Dec. 1995.*

(Continued)

*Primary Examiner* — Alexander H Taningco
*Assistant Examiner* — Renan Luque
(74) *Attorney, Agent, or Firm* — Oblon, McClelland, Maier & Neustadt, L.L.P.

(57) ABSTRACT

An electric power supply device for a plurality of light sources on a motor vehicle. The device includes a plurality of control units configured to control electric power supply of at least one respective light source. The control units each include a diagnostic unit configured to deliver a diagnostic signal for the respective light source. According to the invention, the device is designed to deliver two binary signals for the identification of a partial failure and for the identification of a total failure of light sources.

17 Claims, 4 Drawing Sheets

(56) References Cited

U.S. PATENT DOCUMENTS

| | | | | |
|---|---|---|---|---|
| 2005/0179393 A1* | 8/2005 | Murakami | ............ | B60Q 11/005 315/77 |
| 2006/0087843 A1* | 4/2006 | Setomoto | ............ | H05B 33/0803 362/249.01 |
| 2006/0232394 A1* | 10/2006 | Patel | ................... | B60Q 11/007 340/458 |
| 2009/0295776 A1* | 12/2009 | Yu | ..................... | H05B 33/0818 345/212 |
| 2010/0049454 A1* | 2/2010 | Irissou | ............... | H05B 33/0893 702/58 |
| 2010/0181941 A1 | 7/2010 | Kuo et al. | | |
| 2012/0086337 A1 | 4/2012 | Ohkura et al. | | |
| 2012/0144260 A1* | 6/2012 | Kern | .................... | H03M 13/13 714/752 |
| 2015/0301128 A1* | 10/2015 | Kovatchev | ......... | H05B 33/0893 324/414 |
| 2016/0018457 A1* | 1/2016 | Park | ..................... | G01R 19/165 324/522 |
| 2016/0081171 A1* | 3/2016 | Ichikawa | ............. | B60Q 1/0088 315/77 |
| 2016/0097822 A1* | 4/2016 | Hopfgartner | .......... | G01R 31/44 324/414 |

OTHER PUBLICATIONS

French Preliminary Search Report dated Jan. 19, 2017 in French Application 16 54072 filed on May 4, 2016 (with English Translation of Categories of Cited Documents).

\* cited by examiner

DETECTION OF THE PARTIAL AND/OR TOTAL FAILURE OF A GROUP OF LIGHT SOURCES ON A VEHICLE

The invention relates to the field of the electric power supply of light sources for motor vehicles, specifically sources of the light-emitting diode, or LED type. Specifically, the invention relates to the detection of the failure of such light sources.

A light-emitting diode, or LED, is an electronic component which is capable of emitting light when an electric current flows therein. The light intensity emitted by a LED is generally dependent upon the intensity of the electric current flowing therein. Amongst other elements, a LED is characterized by a current intensity threshold value. This maximum direct current (forward current) generally decreases as the temperature rises. Likewise, where a LED emits light, a voltage drop is observed at its terminals which is equal to its direct voltage (forward voltage). In the motor vehicle sector, LED technology is increasingly used for various light signalling solutions. LEDs are employed for the delivery of lighting functions, including daytime running lights, indicator lights, etc.

From the prior art, the use of a control circuit to control the power supply to a series or group of LEDs is known. The circuit defines the voltage applied to a load-side circuit branch comprising a group of LEDs connected in series. In the field of lighting devices for motor vehicles, it is particularly important to ensure constant light intensity, in order to guarantee the safety of the users of the vehicle, and of other road users. In order to deliver a constant power supply, known control circuits employ various types of converters, whether DC/DC, linear, resistive, etc., to convert the direct voltage supplied, for example, by a vehicle battery, into a direct load voltage which is dependent upon the number of LEDs supplied. It is economically cost-effective to employ control circuits of simple design, for example low-power circuits of the linear types. The use of this type of control circuit dictates the division of all the LEDs involved in the delivery of a given lighting function on the motor vehicle into a number of circuit branches, wherein each branch is controlled and supplied by a dedicated control circuit. Control circuits of the linear type exist, which incorporate diagnostic means. The diagnostic means deliver a signal which is indicative of the operation of the LED circuit branch which is supplied by the control circuit.

However, for reasons of safety, there is a need for a capability for the detection of the total failure of the lighting function in question (i.e. where all the LEDs for the delivery of said function are defective), and of a partial failure of the lighting function (i.e. where one of the groups involved in the delivery of said function is defective).

The object of the invention is the rectification of at least one of the problems posed by the prior art. More specifically, the object of the invention is the disclosure of a power supply device for light sources having diagnostic means which permit the detection of the partial and/or total failure of light sources involved in the execution of a given lighting function on a motor vehicle.

The object of the invention is an electric power supply device for the light sources of a motor vehicle. The device comprises a plurality of means for the control of the electric power supply of at least one light source respectively. The control means each comprise diagnostic means which are configured to deliver a diagnostic signal for said light source. The electric power supply device is noteworthy, in that it comprises a unit for the processing of the diagnostic signals delivered by the plurality of control means. The processing unit is configured to deliver, as a function of said diagnostic signals, a detection signal for the "partial" failure of light sources supplied by one of the control means and/or a detection signal for the "total" failure of the light sources supplied by each of the control means.

In a preferred manner, the control means may each comprise a linear power supply converter.

Preferably, each control means can comprise a single diagnostic output for the delivery of the diagnostic signal.

The processing unit can preferably comprise a microcontroller component connected to the diagnostic means of each of the control means.

Preferably, the processing unit can comprise an AND combinational logic circuit for the delivery of the total failure detection signal on the basis of the diagnostic signals respectively supplied by the diagnostic means of the control means. Preferably, a logic gate of the AND type can combine the diagnostic signals delivered by each of the control means at the input of the processing unit.

Preferably, the processing unit can comprise an OR combinational logic circuit for the delivery of the partial failure detection signal on the basis of the diagnostic signals respectively supplied by the diagnostic means of the control means. Preferably, a logic gate of the OR type can combine the diagnostic signals delivered by each of the control means at the input of the processing unit.

The diagnostic signals delivered by the diagnostic means and/or by the processing unit can preferably be binary signals. The diagnostic signal can preferably be a binary signal having a first level, when the light source is operating correctly, and a second level which differs from the first level, when defective operation is diagnosed.

The control means can preferably comprise a microcontroller element.

A further object of the invention is a lighting module for a motor vehicle, wherein the module comprises a plurality of light sources which are divided between a plurality of groups, and an electric power supply device for the light sources. The module is noteworthy, in that the electric power supply device is compliant with the invention, and in that each group of light sources is supplied via one of the control means of the electric power supply device. Preferably, each group of sources can advantageously be supplied via one of the control means, which is exclusively dedicated thereto.

Preferably, the plurality of light sources can participate in the execution of a given lighting function in a motor vehicle.

The light sources can preferably comprise light sources with a semiconductor element, specifically light-emitting diodes (LEDs), organic light-emitting diodes (OLEDs) or laser diodes.

By the application of the measures proposed in the present invention, it is possible to identify total and/or partial failures in a series of light sources which are involved in the delivery of a given lighting function on a motor vehicle, but which are supplied by a plurality of electric power supply control means. The proposed solution permits the employment of two binary signals for the detection and identification of the failures in question. This results in the use of reduced cabling, in comparison with known solutions. As the device only requires a limited number of cables for the execution of the diagnostic functions required, the electromagnetic compatibility of the device is enhanced in comparison with known devices, which require a greater number of connections, wherein each connection is liable to be affected by electromagnetic interference.

Further characteristics and advantages of the present invention will be clarified by the exemplary description and the drawings, in which.

Unless specifically indicated otherwise, the technical characteristics described in detail for a given form of embodiment can be combined with the technical characteristics described in the context of further forms of embodiment, which are presented by way of an example, and not by way of limitation. Similar reference numbers are employed to describe concepts which are similar throughout various forms of embodiment of the invention. For example, the reference numbers 100, 200, 300 and 400 designate a device according to the invention, in the four forms of embodiment described.

Figure 1:
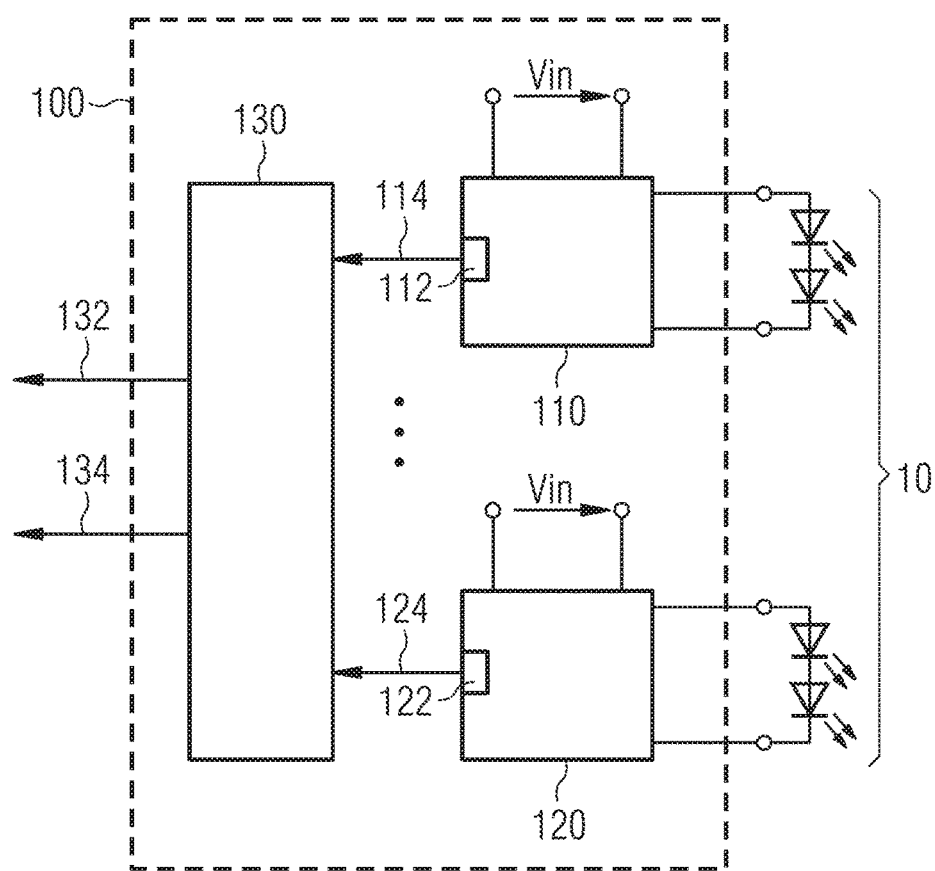
FIG. 1 shows a schematic representation of a device according to one preferred form of embodiment of the invention.

FIG. 1 illustrates a preferred form of embodiment of the invention. An electric power supply device 100 comprises a plurality of control means 110, 120 for the supply of at least one light source respectively. The light sources 10 participate in the delivery of a given lighting function on a motor vehicle. While FIG. 1 represents two control means, greater pluralities are conceivable, according to the intended application, without departing from the scope of the invention. In a known manner, the control means comprise converter circuits, preferably of the linear type, which are designed to convert an input voltage supplied, for example, by a battery on the motor vehicle, into a load voltage which is suitable for the supply of the light sources arranged on the load-side of the control means. The device 100 can comprise an electronic circuit or a microcontroller component for the implementation of the control function for the supply of light sources 10. Circuits and/or microcontroller components of this type are known per se from the prior art, and are not described in detail in the context of the present invention. By way of a non-limiting example, the light sources may be light-emitting diodes, or LEDs.

Each of the control means 110, 120 comprises diagnostic means 112, 122, which are configured to deliver a diagnostic signal 114, 124 for the light source(s) arranged on the load-side of the control means in question. Preferably, this is a binary signal, having a first level when the light source is operating correctly, and a second level, which differs from the first level, when defective operation is diagnosed.

The device 100 additionally comprises a processing unit 130, which combines the diagnostic signals 114, 124 delivered by each of the control means at the input of the unit. The processing unit 130 is configured to deliver, at its output, a detection signal for "partial" failure 132, where power sources supplied by one of the control means are not operating correctly and/or a detection signal for "total" failure 134, where the entirety of power sources supplied by the control means 110, 120 are not operating correctly. Each of the signals 132, 134 is preferably a binary signal, having a first level where no defect is detected, and having a second level, which differs from the first level, in the event of the detection of partial or total failure. The signals 132, 134 are referred to a control module on the vehicle, which is not illustrated. In the case of multiple control means, it is evident that the provision of the processing unit 130 permits the connections provided for diagnostic purposes between the device 100 and the control module of the vehicle to be reduced to two in number.

The processing unit 130 can comprise a microcontroller component which is connected to the diagnostic means 112, 122 of the various control means 122. In combination, or alternatively, the processing unit 130 can also comprise electronic circuits for the execution of logic functions. In the forms of embodiment described hereinafter, the utility of AND and OR logic gates for the combination of the diagnostic signals 114, 124 originating from the various control means 110, 120 will be demonstrated.

Figure 2:
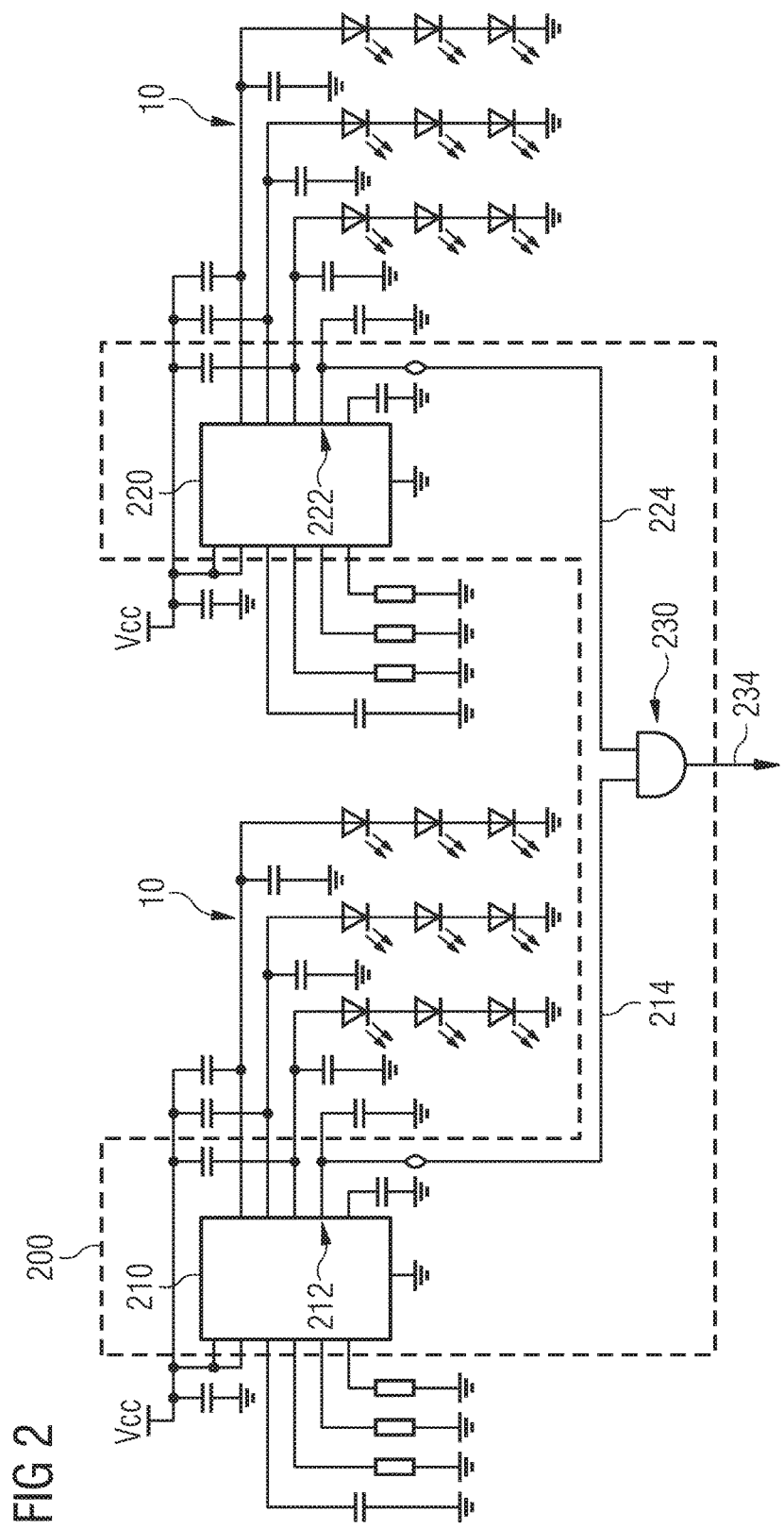
FIG. 2 shows a schematic representation of a device according to one preferred form of embodiment of the invention.

FIG. 2 illustrates a preferred form of embodiment of the invention. An electric power supply device 200 comprises two control means 210, 220 for the supply of at least one light source respectively. Each of the control means 210, 220 supplies a number of LEDs, combined in series in circuit branches. Light sources 10 of the LED type participate in the delivery of a given lighting function on a motor vehicle. The control means each comprise a microcontroller component for the execution of a diagnostic function 212, 222. A dedicated lug of the microcontroller component provides access to the diagnostic signal 214, 224 relating to the LEDs arranged on the load-side of the control means in question. This is preferably a binary signal, having a first level when the light source is operating correctly, and a second level, which differs from the first level, when defective operation is diagnosed.

The processing unit 230 comprises a logic gate of the AND type, which combines the diagnostic signals 214, 224 delivered by each of the control means at the input of the unit. Where the two signals 214, 224 indicate no defect, and assume a first level representing the binary value 0, the output signal 234 also assumes a first level representing the binary value 0. Where only one of the signals 214 or 224 indicates a defect, whereas the other signal 214 or 224 indicates no defect, i.e. one of the signals assumes a first level representing the binary value 0, whereas the second signal assumes a second level representing the binary value 1, the output signal 234 remains at the first level, representing the binary value 0. If, conversely, the two signals 214 and 224 indicate a defect on the LEDs supplied by the control means 210 and 220 respectively, the output signal 234 assumes a second level, which differs from the first level, representing the binary value 1. The signal 234 generated by the processing unit therefore generates a signal which indicates the total failure of the LEDs 10.

Figure 3:
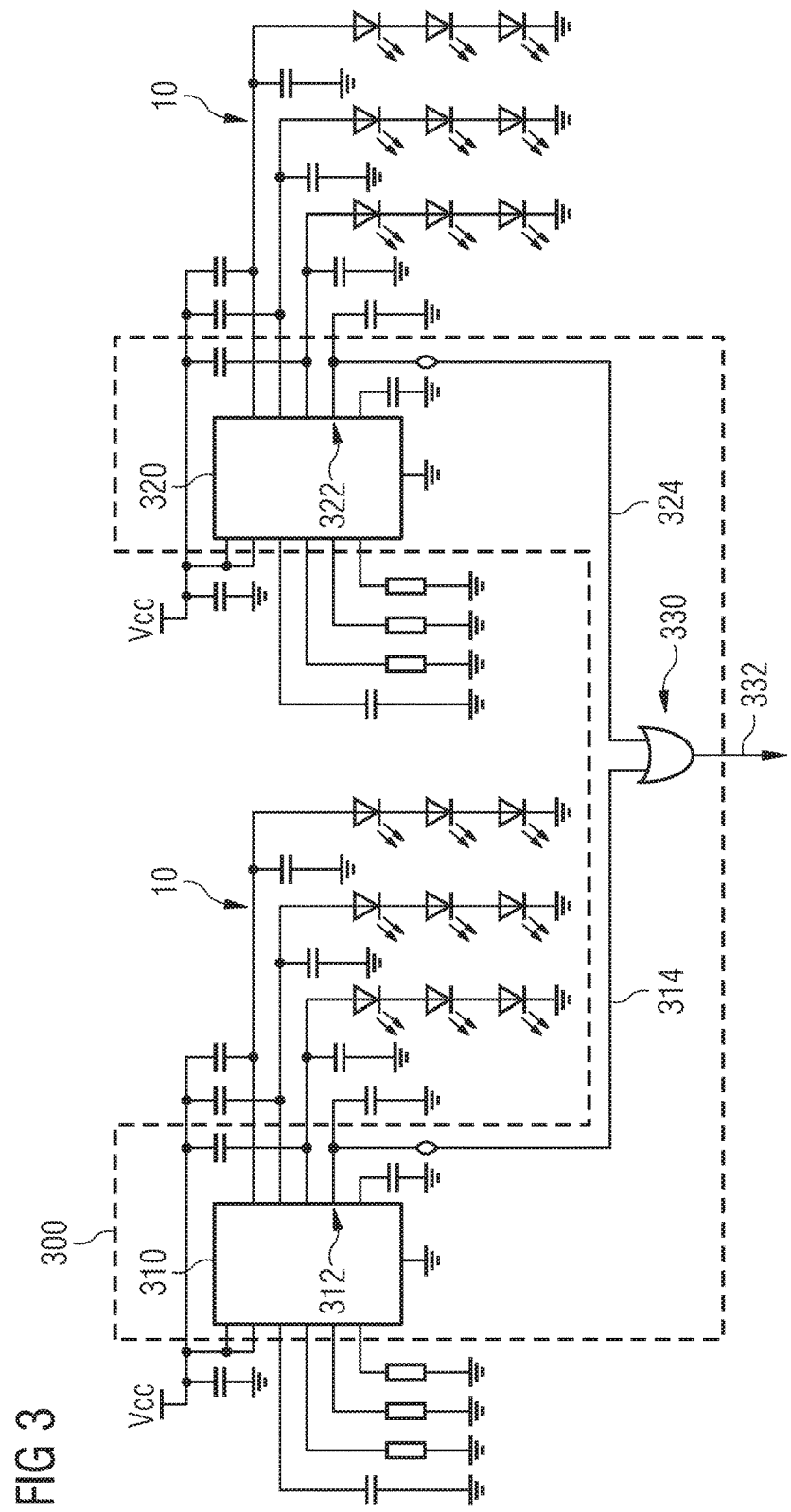
FIG. 3 shows a schematic representation of a device according to one preferred form of embodiment of the invention.

FIG. 3 illustrates a further preferred form of embodiment of the invention. An electric power supply device 300 comprises two control means 310, 320 for the supply of at least one light source respectively. Each of the control means 310, 320 supplies a number of LEDs, combined in series in circuit branches. Light sources 10 of the LED type participate in the delivery of a given lighting function on a motor vehicle. The control means each comprise a microcontroller component for the execution of a diagnostic function 312, 322. A dedicated lug of the microcontroller component provides access to the diagnostic signal 314, 324 relating to the LEDs arranged on the load-side of the control means in question. This is preferably a binary signal, having a first level when the light source is operating correctly, and a second level, which differs from the first level, when defective operation is diagnosed.

The processing unit 330 comprises a logic gate of the OR type, which combines the diagnostic signals 314, 324 delivered by each of the control means at the input of the unit. Where the two signals 314, 324 indicate no defect, and assume a first level representing the binary value 0, the output signal 332 also assumes a first level representing the binary value 0. Where only one of the signals 314 or 324 indicates a defect, whereas the other signal 314 or 324 indicates no defect, i.e. one of the signals assumes a first level representing the binary value 0, whereas the second signal assumes a second level representing the binary value 1, the output signal 332 assumes a second level, which differs from the first level, representing the binary value 1. If the two signals 314 and 324 indicate a defect on the LEDs supplied by the control means 310 and 320 respectively, the output signal 332 also assumes a second level, which differs from the first level, representing the binary value 1. The signal 332 generated by the processing unit therefore generates a signal which indicates the partial failure of the LEDs 10. If at least one of the groups of LEDs supplied by one of the control means 310 or 320 is defective, this will be indicated by the signal 332 as binary level 1.

Figure 4:
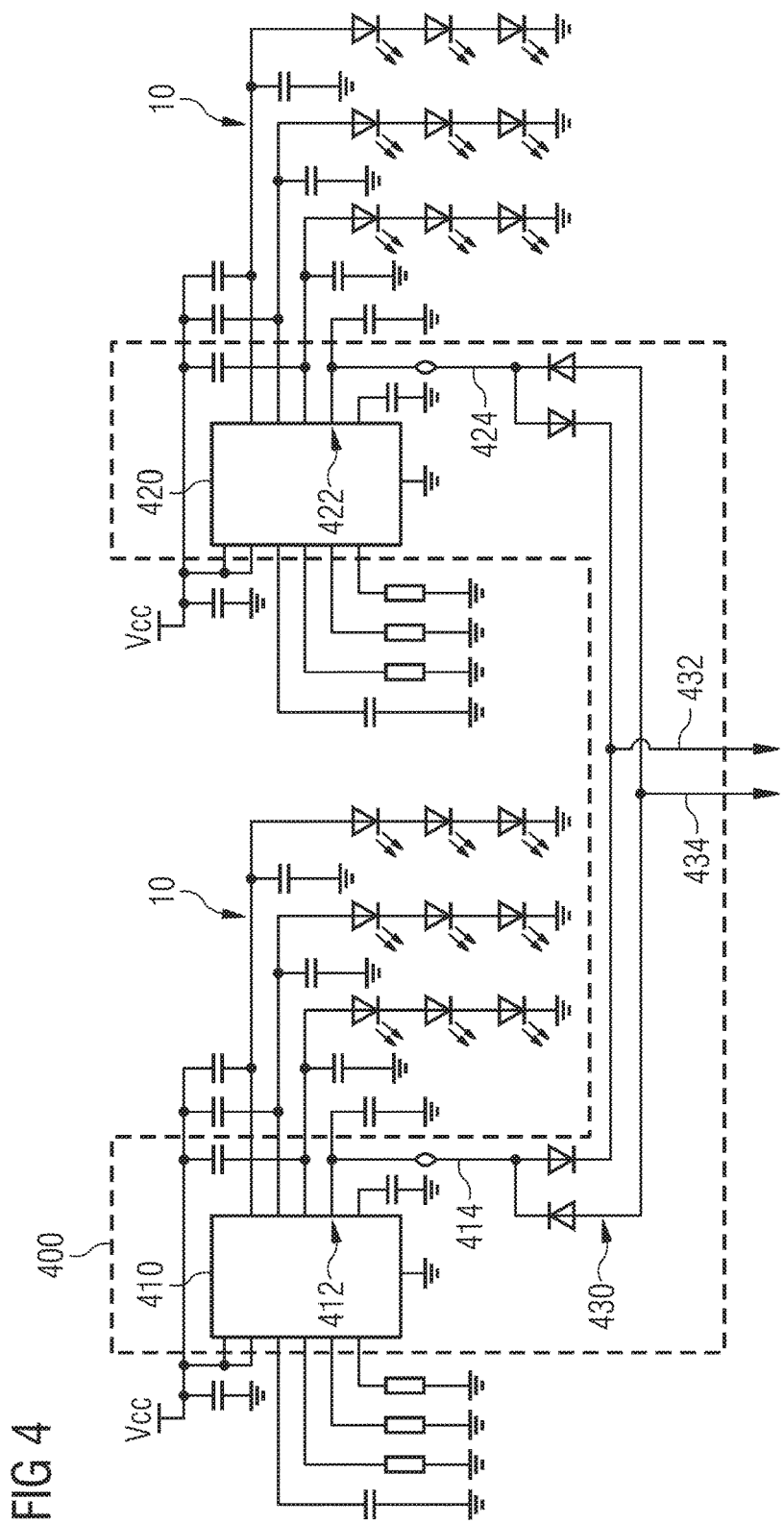
FIG. 4 shows a schematic representation of a device according to one preferred form of embodiment of the invention.

FIG. 4 illustrates a further preferred form of embodiment of the invention. An electric power supply device 400 comprises two control means 410, 420 for the supply of at least one light source respectively. Each of the control means 410, 420 supplies a number of LEDs, combined in series in circuit branches. Light sources 10 of the LED type participate in the delivery of a given lighting function on a motor vehicle. The control means each comprise a microcontroller component for the execution of a diagnostic function 412, 422. A dedicated lug of the microcontroller component provides access to the diagnostic signal 414, 424 relating to the LEDs arranged on the load-side of the control means in question. This is preferably a binary signal, having a first level when the light source is operating correctly, and a second level, which differs from the first level, when defective operation is diagnosed.

The processing unit 430 comprises an electronic circuit forming a logic gate of the OR type, which combines the diagnostic signals 414, 424 delivered by each of the control means at the input of the unit to form an output signal 432, and an electronic circuit forming a logic gate of the AND type, which combines the diagnostic signals 414, 424 delivered by each of the control means at the input of the unit to form an output signal 434. The electronic circuits in question are configured, for example, as diode circuits, whereby other embodiments of the AND/OR functions are also conceivable. As described above with respect to the preceding embodiments, the signal 432 is indicative of a partial failure, whereas the signal 434 is indicative of a total failure of the LEDs 10. Alternatively, the processing unit 430 can be embodied in the form of a microcontroller component which is programmed for this purpose.

A person skilled in the art will be able to undertake the design of the various electronic components involved in the implementation of the forms of embodiment described, in accordance with the specific application intended, without departing from the scope of the present invention.

The invention claimed is:

1. An electric power supply device for a plurality of light sources which provide a vehicle lighting function of a motor vehicle, comprising:
a plurality of control circuits each configured to control electric power supplied to at least one respective light source of the plurality of light sources, wherein each control circuit comprises a diagnostic circuit configured to deliver a diagnostic signal for said at least one respective light source; and
a processing circuit configured to process the diagnostic signals delivered by each of the plurality of control circuits, wherein the processing circuit is configured to deliver, as a function of said diagnostic signals, a first detection signal for partial failure of the vehicle lighting function indicating failure of fewer than all of the plurality of light sources supplied by the control circuits, and a second detection signal that is different from the first detection signal for total failure of all of the light sources supplied by each of the control circuits,
wherein the processing circuit comprises an AND combinational logic circuit that includes a plurality of diodes whose cathodes receive the diagnostic signals from the plurality of control circuits, the AND combinational logic circuit being configured to generate the second detection signal on the basis of the diagnostic signals respectively supplied by the diagnostic circuits of the control circuits.

2. The device according to claim 1, wherein each control circuit comprises a single diagnostic output for the delivery of each diagnostic signal.

3. The device according claim 2, wherein the processing circuit comprises a microcontroller component which is connected to the diagnostic circuit of each of the control circuit.

4. An electric power supply device for a plurality of light sources which provide a vehicle lighting function of a motor vehicle, comprising:
a plurality of control circuits each configured to control electric power supplied to at least one respective light source of the plurality of light sources, wherein each control circuit comprises a diagnostic circuit configured to deliver a diagnostic signal for said at least one respective light source; and
a processing circuit configured to process the diagnostic signals delivered by each of the plurality of control circuits, wherein the processing circuit is configured to deliver, as a function of said diagnostic signals, a first detection signal for partial failure of the vehicle lighting function indicating failure of fewer than all of the plurality of light sources supplied by the control circuits, and a second detection signal that is different from the first detection signal for total failure of all of the light sources supplied by each of the control circuits,
wherein the processing circuit comprises an AND combinational logic circuit that includes a plurality of diodes whose cathodes receive the diagnostic signals from the plurality of control circuits, the AND combinational logic circuit being configured to generate the second detection signal on the basis of the diagnostic signals respectively supplied by the diagnostic circuits of the control circuits,
wherein the processing circuit comprises an OR combinational logic circuit that includes a second plurality of diodes whose anodes receive the diagnostic signals from the plurality of control circuits, the OR combinational logic circuit being configured to generate the first detection signal on the basis of the diagnostic signals respectively supplied by the diagnostic circuits of the control circuits.

5. The device according to claim 4,
wherein the diagnostic signals delivered by the diagnostic circuits and/or the first and second detection signals delivered by the processing circuit are binary signals.

6. The device according to claim 5, wherein the control circuits each comprise a microcontroller component.

7. A lighting module for a motor vehicle, comprising a plurality of groups of light sources and the electric power supply device of claim 1, wherein each group of light sources is supplied via one of the control circuits of the electric power supply device.

8. The lighting module according to claim 7, wherein the groups of light sources comprise at least one light-emitting diodes (LEDs), organic light-emitting diodes (OLEDs) or laser diodes.

9. The device according to claim 1, wherein the processing circuit comprises a microcontroller component which is connected to the diagnostic circuits of each of the control circuits.

10. The device according to claim 1, wherein the diagnostic signals delivered by the diagnostic circuits and/or the first and second detection signals delivered by the processing circuit are binary signals.

11. The device according to claim 1, wherein the control circuits each comprise a microcontroller component.

12. A lighting module for a motor vehicle, comprising a plurality of groups of light sources, and the electric power supply device of claim 2, wherein each group of light sources is supplied via one of the control circuits of the electric power supply device.

13. A lighting module for a motor vehicle, comprising a plurality of groups of light sources, and the electric power supply device of claim 3, wherein each group of light sources is supplied via one of the control circuits of the electric power supply device.

14. The lighting module according to claim 7, wherein the light sources comprise at least one of light-emitting diodes (LEDs), organic light-emitting diodes (OLEDs) or laser diodes.

15. An electric power supply device for a plurality of light sources which provide a vehicle lighting function of a motor vehicle, comprising:
a plurality of control circuits each configured control electric power supplied to at least one respective light source of the plurality of light sources, wherein each control circuit comprises a diagnostic circuit configured to deliver a diagnostic signal for said at least one respective light source, wherein the diagnostic signal is binary signal having a first level when the light source is operating correctly, and a second level which differs from the first level when the lights source has defective operation; and
a processing circuit configured to process the diagnostic signals delivered by each of the plurality of control circuits, wherein the processing circuit includes a first diode circuit that receives diagnostic signals from the plurality of circuits via anodes thereof and that is configured to deliver, as a function of said diagnostic signals, a first detection signal for partial failure of the vehicle lighting function indicating failure of fewer than all of the plurality of light sources supplied by the control circuits, the processing circuit further including a second diode circuit that receives diagnostic signals from the plurality of circuits via cathodes thereof and that is configured to deliver a second detection signal that is different from the first detection signal for total failure of all of the light sources supplied by each of the control circuits.

16. The device according to claim 15, wherein each control circuit has only a single diagnostic signal line for the delivery of said diagnostic signal of the respective control circuit.

17. The device according to claim 15, wherein each control circuit is a linear control circuit having only a single dedicated signal line for the delivery of said diagnostic signal of the respective control circuit.

* * * * *